(12) United States Patent
Kondo et al.

(10) Patent No.: US 7,110,031 B2
(45) Date of Patent: Sep. 19, 2006

(54) STATE IMAGE PICKUP APPARATUS HAVING PIXEL SHIFT LAYOUT

(75) Inventors: Ryuji Kondo, Miyagi (JP); Tetsuo Yamada, Miyagi (JP)

(73) Assignee: Fuji Photo Film Co., Ltd., Minami-ashigara (JP)

(*) Notice: Subject to any disclaimer, the term of this patent is extended or adjusted under 35 U.S.C. 154(b) by 661 days.

(21) Appl. No.: 10/022,377

(22) Filed: Dec. 20, 2001

(65) Prior Publication Data

US 2002/0085103 A1 Jul. 4, 2002

(30) Foreign Application Priority Data

Dec. 27, 2000 (JP) ............. 2000-398244

(51) Int. Cl.
H04N 3/14 (2006.01)
H04N 5/335 (2006.01)

(52) U.S. Cl. .............. 348/315; 348/275; 348/272

(58) Field of Classification Search ........... 348/272, 348/315, 275, 277, 294, 273, 280
See application file for complete search history.

(56) References Cited

U.S. PATENT DOCUMENTS

| 5,218,430 | A | * | 6/1993 | Roeh ........................ 348/453 |
| 5,251,019 | A | * | 10/1993 | Moorman et al. ........... 348/275 |
| 5,280,347 | A | * | 1/1994 | Shiraishi et al. ......... 348/223.1 |
| 5,581,357 | A | * | 12/1996 | Sasaki et al. .............. 348/235 |
| 5,592,575 | A | * | 1/1997 | Nakazato ................... 382/312 |
| 5,663,759 | A | * | 9/1997 | Horng et al. ............. 348/222.1 |
| 5,771,074 | A | * | 6/1998 | Ibenthal ..................... 348/444 |
| 5,991,504 | A | * | 11/1999 | Hori .......................... 386/112 |
| 6,252,218 | B1 | * | 6/2001 | Chou ....................... 250/208.1 |
| 6,522,356 | B1 | * | 2/2003 | Watanabe .................. 348/272 |
| 6,573,935 | B1 | * | 6/2003 | Yamada ..................... 348/272 |
| 6,657,755 | B1 | * | 12/2003 | Campbell ................... 358/514 |
| 6,720,993 | B1 | * | 4/2004 | Hwang et al. .......... 348/208.13 |
| 6,724,932 | B1 | * | 4/2004 | Ito ............................ 382/162 |
| 6,754,402 | B1 | * | 6/2004 | Matama ..................... 382/300 |
| 6,765,616 | B1 | * | 7/2004 | Nakano et al. ............ 348/322 |
| 6,806,904 | B1 | * | 10/2004 | Kim .......................... 348/315 |
| 6,882,364 | B1 | * | 4/2005 | Inuiya et al. .............. 348/252 |
| 6,897,425 | B1 | * | 5/2005 | Osada ..................... 250/208.1 |
| 6,900,838 | B1 | * | 5/2005 | Fujimura et al. ........... 348/273 |
| 2002/0021363 | A1 | * | 2/2002 | Jaspers ..................... 348/273 |
| 2002/0057354 | A1 | * | 5/2002 | Yanai et al. ............... 348/273 |
| 2002/0076114 | A1 | * | 6/2002 | Prakash et al. ............ 382/248 |
| 2005/0134713 | A1 | * | 6/2005 | Keshet et al. ............. 348/273 |

* cited by examiner

FOREIGN PATENT DOCUMENTS

JP 2000184386 A * 6/2000

*Primary Examiner*—Tuan Ho
*Assistant Examiner*—Nelson D. Hernandez
(74) *Attorney, Agent, or Firm*—Arent Fox PLLC

(57) ABSTRACT

A color shooting solid state image pickup apparatus is composed by using a solid state image pickup device having a number of color pixels disposed in a plurality of rows and columns in a pixel shift layout with distributing at least one color-type color pixels in a square lattice pattern aligned in row and column directions and by using a video signal proceeding unit being able to perform interpolation processes using color information obtained from pixel signals output from the solid state image pickup device excepting one piece of color information obtained from pixel signals of the color pixels distributed in a square lattice pattern. A moving image having a smooth motion can be reproduced on a monitor even if the process performance of the video signal proceeding unit is not improved so much.

10 Claims, 12 Drawing Sheets

FIG. 3A
| Row\Col | 1 | 2 | 3 | 4 | 5 | 6 | 7 | 8 | 9 |
|---|---|---|---|---|---|---|---|---|---|
| 9 | B |   | R |   | B |   | R |   | B |
| 8 |   | G |   | G |   | G |   | G |   |
| 7 | R |   | B |   | R |   | B |   | R |
| 6 |   | G |   | G |   | G |   | G |   |
| 5 | B |   | R |   | B |   | R |   | B |
| 4 |   | G |   | G |   | G |   | G |   |
| 3 | R |   | B |   | R |   | B |   | R |
| 2 |   | G |   | G |   | G |   | G |   |
| 1 | B |   | R |   | B |   | R |   | B |
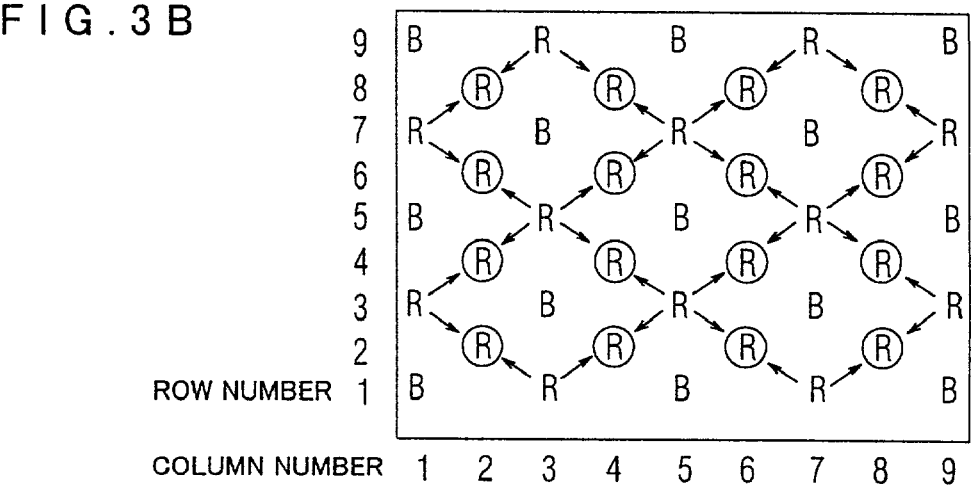
FIG. 3B
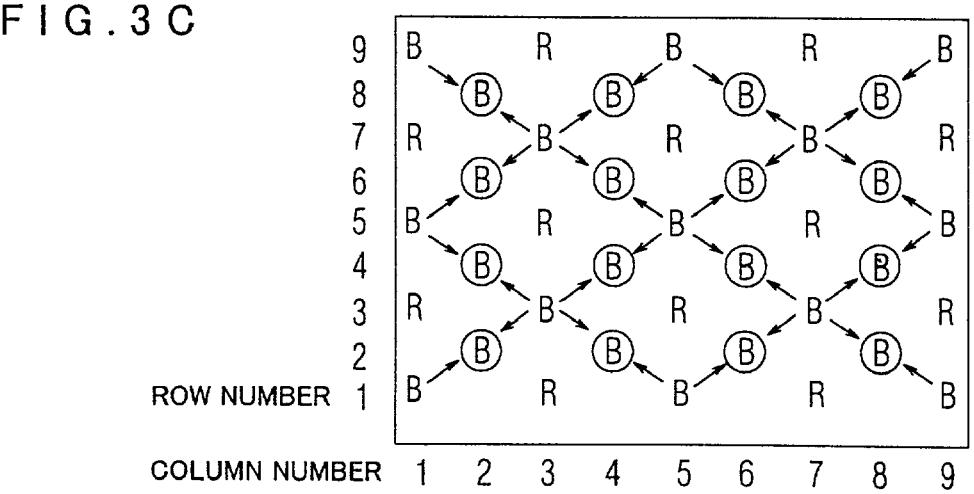
FIG. 3C

FIG.4

```
9
8      P       P       P       P
7
6      P       P       P       P
5
4      P       P       P       P
3
2      P       P       P       P
ROW NUMBER  1

COLUMN NUMBER  1  2  3  4  5  6  7  8  9
```

F I G . 5

|   | 1 | 2 | 3 | 4 | 5 | 6 | 7 | 8 | 9 |
|---|---|---|---|---|---|---|---|---|---|
| 9 | P | P | P | P | P | P | P | P | P |
| 8 | P | P | P | P | P | P | P | P | P |
| 7 | P | P | P | P | P | P | P | P | P |
| 6 | P | P | P | P | P | P | P | P | P |
| 5 | P | P | P | P | P | P | P | P | P |
| 4 | P | P | P | P | P | P | P | P | P |
| 3 | P | P | P | P | P | P | P | P | P |
| 2 | P | P | P | P | P | P | P | P | P |
| 1 | P | P | P | P | P | P | P | P | P |

ROW NUMBER (vertical axis) / COLUMN NUMBER (horizontal axis)

STATE IMAGE PICKUP APPARATUS HAVING PIXEL SHIFT LAYOUT

CROSS REFERENCE TO RELATED APPLICATION

This application is based on Japanese Patent Application 2000-398244, filed on Dec. 27, 2000, the entire contents of which are incorporated herein by reference.

BACKGROUND OF THE INVENTION

A) Field of the Invention

The present invention relates to a solid state image pickup apparatus for color image pickup using a solid state image pickup device of a charge coupled device (CCD) type, a metal oxide semiconductor (MOS) type or another type as an area image sensor, and more particularly to a solid state image pickup apparatus using a simultaneous single-plate type color image pickup device.

B) Description of the Related Art

Solid state image pickup apparatuses for color image pickup using solid state image pickup devices as area image sensors are prevailing nowadays. Such solid state image pickup apparatuses are used, for example, in digital cameras, in digital cameras built in personal computers, personal digital assistants or the like.

Color shooting solid state image pickup apparatuses are roughly classified into a single-plate type and a three-plate type according to their image pickup methods. Single-plate type solid state image pickup apparatuses are further classified into a frame sequential type which time sequentially picks up color image information of each color, and a concurrent type which picks up color image information of all colors at the same time. A general purpose solid state image pickup apparatus generally uses a concurrent single plate type solid state image pickup device (hereinafter simply called a "solid state image pickup device").

A solid state image pickup device has about several hundred thousand to several million color pixels. Each color pixel includes one photoelectric conversion element made of, e.g., a photodiode and one color filter disposed above the photoelectric conversion element (before the element in a light incidence course).

A solid state image pickup device has a predetermined number of color pixels including at least three color-types each of which detects color information different from each other. Color information detected by each color pixel is dependent upon a color of the color filter. For example, in the solid state image pickup device using primary color filters, the color pixels are classified into three color-types of red, green and blue. In the solid state image pickup device using complementary color filters, the color pixels are classified into three to four color-types. The complementary color filters often constitute one color filter array together with green color filters. Color pixels are disposed in a square matrix layout or in a pixel shift layout. The "square matrix layout" used in this specification is intended to include a matrix layout having different numbers of rows and columns.

The "pixel shift layout" used in this specification is intended to mean a number of color pixels disposed in the following manner. Each color pixel in an odd number column is shifted in the column direction from each pixel in an even number column by about a half of the pitch between color pixels in the column, whereas each color pixel in an odd number row is shifted in the row direction from each pixel in an even number row by about a half of the pitch between color pixels in the row, and each column contains only color pixels of either the odd rows or even rows. The "pixel shift layout" is one example of the layouts of a number of color pixels disposed in a plurality of rows and columns in a matrix shape.

The term "about a half of the pitch of color pixels in the column" is intended to include a precise half as well as a substantial half. Although the substantial half is not a precise half because of manufacture errors, rounding errors of pixel arrangement caused by design or mask manufacture, this value can be regarded as substantially the half from the viewpoint of the total performance of a solid state image pickup device and the image quality. The term "about a half of the pitch of color pixels in the row" is also intended to include a precise half as well as a substantial half.

As light becomes incident upon a color pixel, electric charge corresponding to the quantity of incidence light is accumulated in the photosensitive conversion element. A solid state image pickup device can sequentially output signals corresponding to the charges accumulated in color pixels. Each of these signals is called a "pixel signal" in this specification. Each pixel signal contains color information of substantially one color only.

A solid state image pickup apparatus generates a number of pixel signals for reproducing an image by using pixel signals sequentially output from a solid state image pickup device. In this specification, each of the pixel signals for reproducing an image is called an "output pixel signal".

In accordance with output pixel signals from the solid state image pickup apparatus, an image constituted of a number of pixels is reproduced on a monitor or by a printer. In this specification, each of the pixels is called a "reproduction pixel".

Spatial mixing is generally used for full-color printing by a printer and for full-color display by a monitor. Spatial mixing can be realized by additive mixing or subtractive mixing. In most cases, additive mixing of red, green and blue is performed. One pixel of a full-color image formed by additive mixing includes red, green and blue colors information. Each reproduction pixel includes therefore red, green and blue colors information.

A color shooting solid state image pickup apparatus generates three output pixel signals per one reproduction pixel, i.e., a red output pixel signal containing red color information, a green output pixel signal containing green color information, a blue output pixel signal containing blue color information. Three output pixel signals of red, green and blue per one reproduction pixel are called a "set of output pixel signals".

If a solid state image pickup device uses complementary color filters, complementary color information is converted into primary color information, prior to executing an interpolation process to be later described.

As described earlier, a pixel signal of a color pixel of a solid state image pickup device contains color information of substantially one color only. Therefore, of color information to be contained in one set of output pixel signals, two pieces of color information not obtained from the pixel signal of one color pixel are generated through interpolation processes using signals based on pixel signals of other color pixels.

For example, of the color information to be contained in one set of output pixel signals for a reproduction pixel corresponding to one particular green pixel of the solid state image pickup device, green color information is obtained from a signal based on a pixel signal of one green pixel, red color information is generated by interpolation process using signals based on pixel signals of a plurality of red pixels disposed near the green pixel, and blue color information is generated by interpolation process using signals based on pixel signals of a plurality of blue pixels near the green pixel.

Most of solid state image pickup apparatuses have functions of generating output pixel signals at a relatively high resolution and at a relatively low resolution.

For example, output pixel signals generated at a relatively high resolution are stored in a recording medium and then printed out by a printer or the like to reproduce a fine still image. The number of output pixels is, for example, equal to the number of effective pixels of the solid state image pickup device, e.g., several hundred thousand to several million pixels.

If a solid state image pickup device having a number of color pixels disposed in the pixel shift layout is used, it is possible to generate output pixel signals, by interpolation, corresponding to virtual pixels each of which arranged between adjacent two color pixels in each color pixel column or each color pixel row of the solid state image pickup device. In this case, output pixel signals corresponding to about twice as many reproduction pixels as the total number of color pixels (effective pixels) of the solid state image pickup device can be obtained.

Output pixel signals generated at a relatively low resolution are output to a monitor of the solid state image pickup apparatus or another apparatus to reproduce a still image or moving image. The number of output pixels depends upon the number of pixels of the monitor.

The number of pixels of a monitor is determined by various standards. For example, 176×144 (about twenty five thousand) pixels according to the Quarter Common Intermediate Format (QCIF), 352×288 (about one hundred thousand) pixels according to the Common Intermediate Format (CIF), 640×480 (about three hundred thousand) according to the Video Graphics Array (VGA), and 1280×960 (about one million and two hundred thirty thousand pixels according to the Super Extended Video Graphics Array (SXVGA). Other standards are also known.

In order to reproduce a moving image having a smooth motion, it is necessary to output a number of output pixel signals in the predetermined order at a high frame frequency. A high process performance is therefore necessary for a signal processing circuit which generates output pixel signals. As a result, the productivity of a solid state image pickup apparatus becomes lower and the manufacture cost of the apparatus becomes higher.

SUMMARY OF THE INVENTION

It is an object of the present invention to provide a solid state image pickup apparatus capable of generating output pixel signals by relatively simple signal processing.

According to one aspect of the present invention, there is provided a solid state image pickup apparatus comprising: a solid state image pickup device having a number of color pixels disposed in a plurality of rows and columns in a pixel shift layout and generating and outputting pixel signals, said number of color pixels including at least three kinds of color pixels, color pixels of one of said at least three kind being distributed in a square lattice pattern aligned in row and column directions; and a first signal processing unit for generating output pixel signals by using signals based on said pixel signals, said first signal processing unit generating a part of output pixel signals directly from signals based on pixel signals of the color pixels of said one kind and generating another part of output pixel signals through interpolation process using signals based on pixel signals of color pixels of another of said at least three kinds.

In this solid state image pickup apparatus, signals based on pixel signals of color pixels of one color-type distributed in the square lattice pattern is not subjected to an interpolation process, in generation of the output pixel signals. Of the red, green and blue color information to be contained in each set of output pixel signal, each of the color information of only two colors is generated by interpolation process.

Of the color information of three colors to be contained in one set of output pixel signals, the color information of one color can be obtained without performing the interpolation process. It is possible to obtain output pixel signals by relatively simple signal processing.

An image reproduced by a printer or on a monitor has reproduction pixels distributed in the square matrix shape. Therefore, it is desired that the output pixel signals from the solid state image pickup apparatus are in correspondence with the reproduction pixels distributed in the square matrix shape.

Although the color pixels of the solid state image pickup device of the solid state image pickup apparatus are distributed in the pixel shift layout, it is possible to generate output pixel signals corresponding to color pixels of one color-type distributed in the square lattice pattern in the solid-state image pickup device. Output pixel signals suitable for reproducing an image whose pixels are distributed in the square matrix shape can be generated by relatively simple signal processing.

The number of output pixels of the solid state image pickup apparatus is smaller than the total number of color pixels (effective pixels) of the solid state image pickup device. However, for example, in a conventional solid state image pickup apparatus capable of taking both a still image and a moving image, the number of output pixels of a moving image is generally smaller than that of a still image. Therefore, a reduction in the number of output pixels does not pose a substantial problem.

The solid state image pickup apparatus can be structured in the following manner. For example, output pixel signals for an image which may be reproduced at a relatively low resolution, such as an image to be reproduced on a monitor, are generated by the first signal processing unit, and output pixel signals for an image which is required to be reproduced at a relatively high resolution, such as a high definition still image, are generated by another signal processing unit.

In this specification, "color pixels distributed in the square lattice pattern" are intended to include different numbers of color pixels in the row and column and different pitches of color pixels in the row and column directions.

BRIEF DESCRIPTION OF THE DRAWINGS

FIG. 3A is a schematic diagram showing the layout of color pixels of the solid state image pickup device shown in FIG. 2.

FIG. 3B is a conceptual diagram illustrating an interpolation process for generating color information of red to be executed by a first signal processing unit of a video signal proceeding unit shown in FIG. 1.

FIG. 3C is a conceptual diagram illustrating an interpolation process for generating color information of blue to be executed by the first signal processing unit of the video signal proceeding unit shown in FIG. 1.

FIG. 4 is a conceptual diagram showing a distribution of reproduction pixels of an image reproduced on a monitor or by a printer in accordance with output pixel signals generated by the first signal processing unit.

FIG. 5 is a conceptual diagram showing a distribution of reproduction pixels of an image reproduced on a monitor or by a printer in accordance with output pixel signals generated by a second signal processing unit.

DESCRIPTION OF THE PREFERRED EMBODIMENTS

Figure 1:
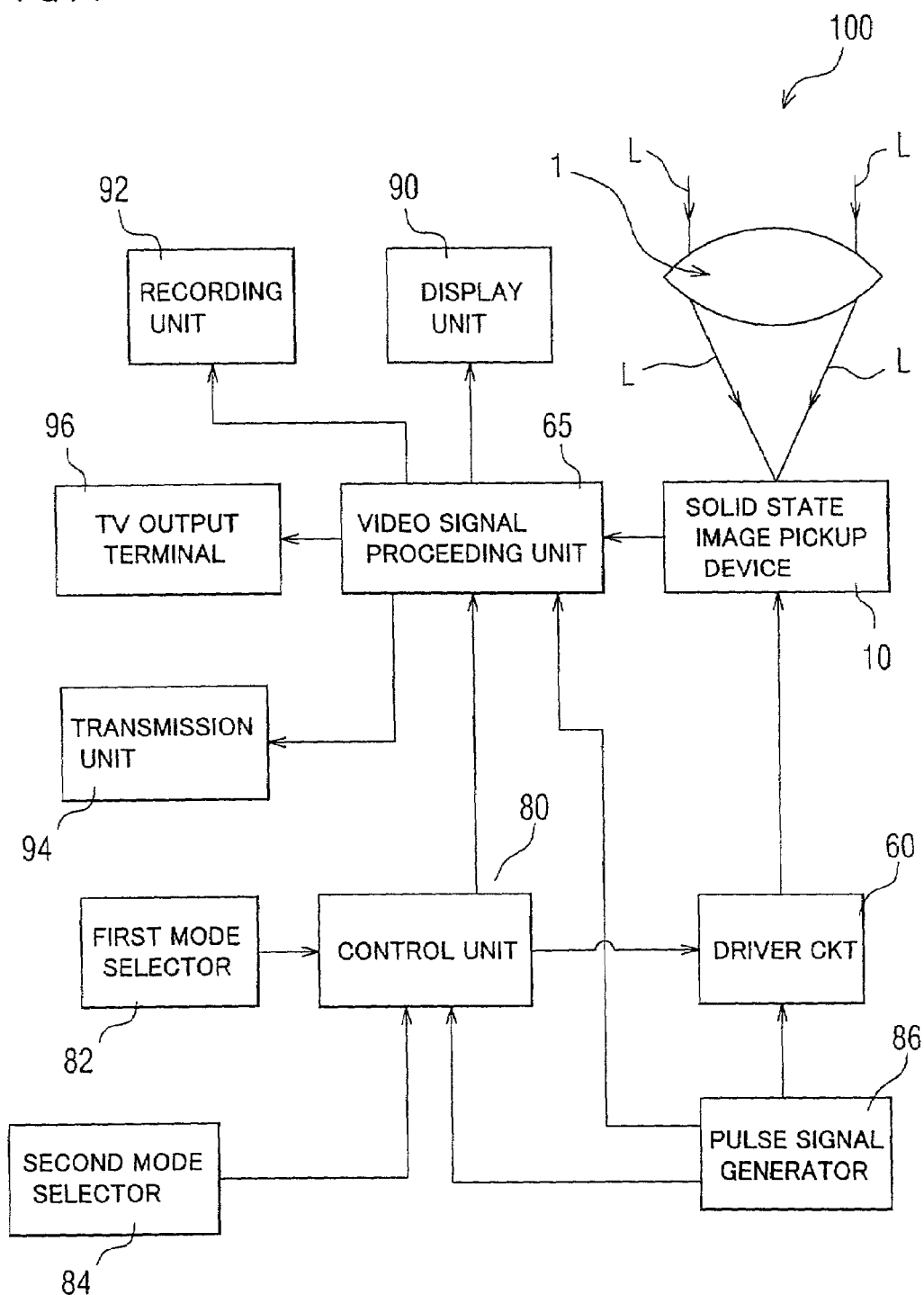
FIG. 1 is a schematic block diagram showing a solid state image pickup apparatus according to a first embodiment of the invention.

FIG. 1 is a schematic block diagram showing a solid state image pickup apparatus according to a first embodiment. As shown in FIG. 1, the solid state image pickup apparatus 100 has an image pickup optical system 1, a solid state image pickup device 10, a driver circuit 60, a video signal proceeding unit 65, a control unit 80, a first mode selector 82, a second mode selector 84, a pulse signal generator 86, a display unit 90, a recording unit 92, a transmission unit 94, and a television output terminal (hereinafter abbreviated to a "TV output terminal") 96.

The image pickup optical system 1 focuses an optical image upon the solid state image pickup device 10. For example, the image pickup optical system 1 includes optical lenses, a diaphragm, an optical low-pass filter and the like. An arrow L in FIG. 1 represents light.

The solid state image pickup device 10 converts an optical image focused by the image pickup optical system 1 into electric signals. The solid state image pickup device 10 has a number of color pixels necessary for color image pickup and an output unit. The output unit outputs electric signals (pixel signals) representing to electric charge accumulated in the color pixels. The specific structure of the solid state image pickup device 10 will be later described with reference to FIGS. 9 to 11.

The driver circuit 60 supplies drive signals to the solid state image pickup device 10 for image pickup operation. For example, the driver circuit 60 is constituted of a vertical driver, a horizontal driver, a DC power source and the like.

The video signal proceeding unit 65 receives pixel signals generated by the solid state image pickup device 10, and executes various processes for the pixel signals to generate output pixel signals. The generated output pixel signals are supplied to the display unit 90, recording unit 92, transmission unit 94 or TV output terminal 96.

The video signal proceeding unit 65 includes a first signal processing unit for generating output pixel signals at a relatively low resolution and a second signal processing unit for generating output pixel signals at a relatively high resolution. The specific configuration of the video signal proceeding unit 65 will be later described with reference to FIG. 7.

The control unit 80 controls the operations of the driver circuit 60 and video signal proceeding unit 65. The control unit 60 is made of, for example, a central processing unit (CPU).

The first mode selector 82 is a selection switch for selecting an image pickup mode of the solid state image pickup apparatus 100. For example, the solid state image pickup apparatus 100 has a first image pickup mode for generating output pixel signals at a relatively low resolution and a second image pickup mode for generating output pixel signals at a relatively high resolution. For example, the first image pickup mode is suitable for shooting a moving image, and the second image pickup mode is suitable for shooting a high definition still image. The first mode selector 82 is operated by a user of the solid state image pickup apparatus 100.

The second mode selector 84 is a selection switch for designating the destination of image pickup data (output pixel signals) of the solid state image pickup apparatus 100. The solid state image pickup apparatus 100 can output the image pickup data to the display unit 90, recording unit 92, transmission unit 94 or TV output terminal 96. The second mode selector 84 is also operated by a user of the solid state image pickup apparatus 100.

The pulse signal generator 86 generates pulse signals for synchronizing the whole operations of various circuits, and supplies they to the driver circuit 60, video signal proceeding unit 65 and control unit 80. For example, the pulse signal generator 86 is constituted of an oscillator for generating pulses at a constant period, a timing generator and the like.

In accordance with output pixel signals supplied from the video signal proceeding unit 65, the display unit 90 displays a still image or moving image. The display unit 90 may be a liquid crystal display unit or other display units.

The recording unit 92 stores output pixel signals supplied from the video signal proceeding unit 65 in a recording medium such as a memory card.

The transmission unit 94 converts output pixel signals supplied from the video signal proceeding unit 65 into a predetermined format (e.g., MPEG) and transmits the converted output pixel signals to a communication channel. For example, if the transmission unit 94 performs wired transmission, it has a format conversion unit connected to a modulator-demodulator (modem). For example, if the transmission unit 94 performs wireless transmission, it is constituted of a format conversion unit for converting the output pixel signals to transmission signal format, an oscillator circuit for generating the radio carrier wave, an antenna and the like.

The TV output terminal 96 is used for interconnection between the solid state image pickup apparatus 100 and a television (not shown) via a cable or the like.

In the solid state image pickup apparatus 100 having these constituent elements, color pixels of the solid state image pickup device 10 have a special layout.

Figure 2:
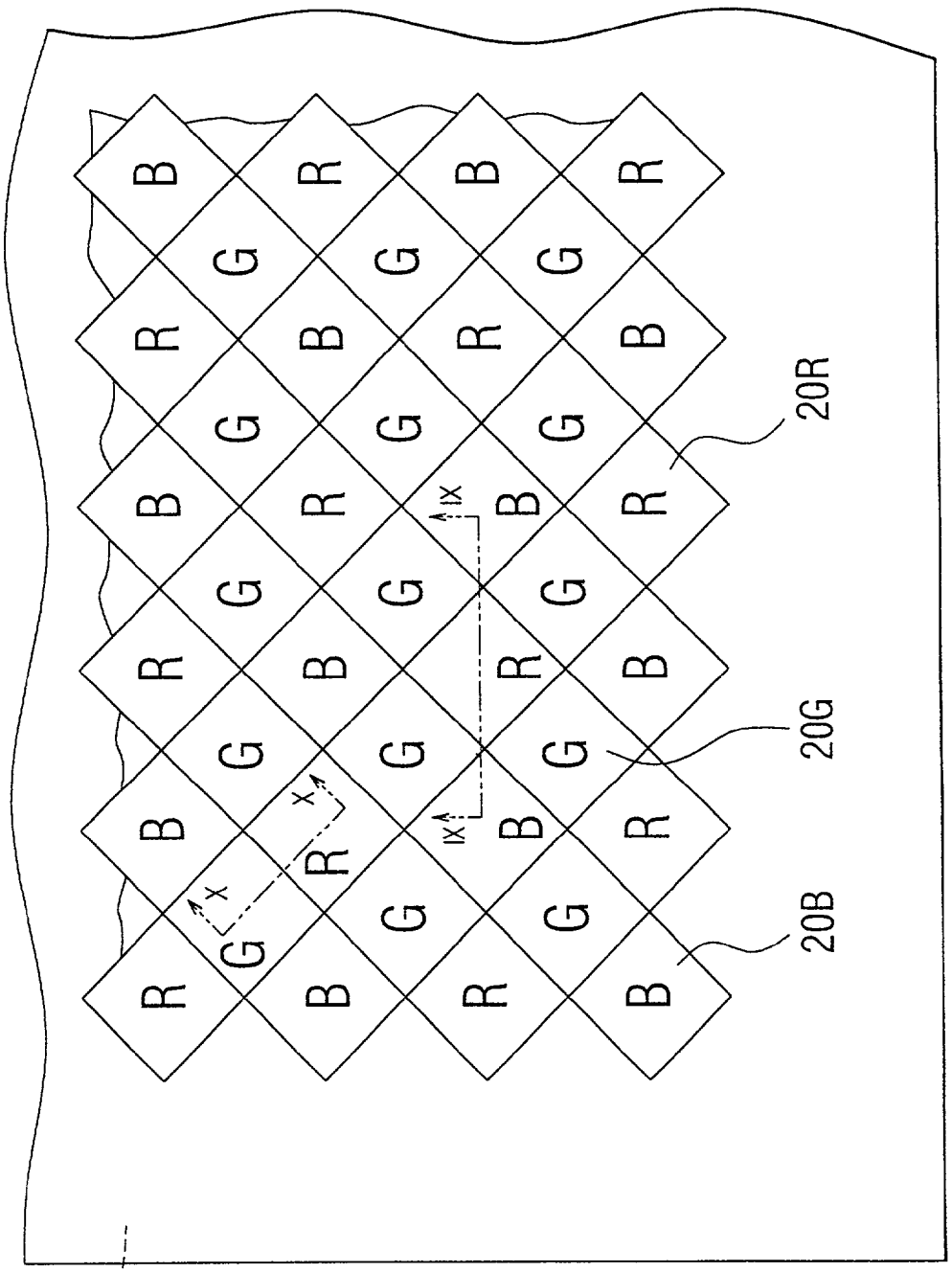
FIG. 2 is a schematic plan view showing a solid state image pickup device usable by the solid state image pickup apparatus shown in FIG. 1.

FIG. 2 is a schematic diagram showing an example of a solid state image pickup device usable as the solid state image pickup device 10. In a solid state image pickup device 10a shown in FIG. 2, three color-types of color pixels including red pixels 20R, green pixels 20G and blue pixels 20B are disposed in the pixel shift layout and special patterns.

More specifically, the green pixel 20G is disposed at every second rows and columns along the pixel column direction and pixel row direction, respectively, and the green pixels are disposed as a whole in a square lattice pattern. On both sides along the column direction of each green pixel row, a pixel row (hereinafter called a "red/blue pixel row") is disposed which has a red pixel 20R and a blue pixel 20B disposed at every second columns. Two juxtaposed red/blue pixel rows sandwiching green pixel row have the reversed orders of the red pixels 20R and blue pixels 20B from each other.

In the solid state image pickup device 10a, a pixel signal from a green pixel 20G of the green pixel row and a pixel signal from a red pixel 20R or a blue pixel 20B of the red/blue pixel row downstream of the green pixel row are alternately output one pixel signal after another. For example, from the most downstream pixel row and the second most downstream pixel row, a pixel signal from the blue pixel 20B, a pixel signal from the green pixel 20G, a pixel signal from the red pixel 20R, and a pixel signal from the green pixel 20G are sequentially output in this order.

In this specification, assuming that transfer of a signal from a color pixel to the video signal proceeding unit is regarded as one flow, the relative position of each component is defined as "upstream of something" or "downstream of something", when necessary.

As described earlier, the video signal proceeding unit 65 shown in FIG. 1 generates output pixel signals in accordance with pixel signals supplied from the solid state image pickup device 10a. While the first image pickup mode is selected by the first mode selector 82, pixel signals supplied to the video signal proceeding unit 65 are converted to the output pixel signals through the first signal processing unit which generates the output pixel signals at the relatively low resolution.

The first signal processing unit does not subject color information (signals) obtained from pixel signals of the green pixels 20G to an interpolation process for generating output pixel signals for reproduction pixels of a reproduction image. While each of the color information (signals) obtained from pixel signals of the blue and red pixels 20B and 20R is subjected to interpolation process in the first signal processing unit for generating the output pixel signals. The reproduction pixels are at the relatively corresponding position of the green pixels 20G.

The concept of the interpolation processes by the first signal processing unit will be described with reference to FIGS. 3A, 3B and 3C.

FIG. 3A is a schematic diagram showing the layout of color pixels of the solid state image pickup device 10a. In FIGS. 3A to 3C, a character G represents a green pixel, a character R represents a red pixel, and a character B represents a blue pixel. In order to simplify the identification of each pixel, the pixel rows and columns are numbered.

In the following description, each pixel is identified by using one of the characters R, G and B, one row number and one column number. For example, a "red pixel $R_{57}$" is a red pixel R at the fifth row and seventh column.

FIG. 3B illustrates the concept of the interpolation process for generating color information of the red to be executed by the first signal processing unit. The circled character R in FIG. 3B represents red color information generated by interpolation process.

As shown in FIG. 3B, red color information of a reproduction pixel to be contained in one set of output pixel signals corresponding to the position of the green pixel G (refer to FIG. 3A) is generated by interpolation process using color information obtained from pixel signals of two red pixels R on the upper left upstream side and lower right downstream side, or on the upper right upstream side and lower left downstream side. For example, red color information to be contained in one set of output pixel signals for a reproduction pixel corresponding to the position of the green pixel G44 is generated by interpolation process using color information obtained from pixel signals of two red pixels $R_{53}$ and $R_{35}$. Red color information to be contained in one set of output pixel signals for a reproduction pixel corresponding to the position of the green pixel G64 is generated by interpolation process using color information obtained from pixel signals of two red pixels $R_{75}$ and $R_{53}$.

FIG. 3C illustrates the concept of the interpolation process for generating color information of the blue to be executed by the first signal processing unit. The circled character B in FIG. 3C represents blue color information generated by interpolation process.

As shown in FIG. 3C, blue color information of a reproduction pixel to be contained in one set of output pixel signals corresponding to the position of the green pixel G (refer to FIG. 3A) is generated by interpolation process using color information obtained from pixel signals of two blue pixels B on the upper right upstream side and lower left downstream side, or on the upper left upstream side and lower right downstream side. For example, blue color information to be contained in one set of output pixel signals for a reproduction pixel corresponding to the position of the green pixel $G_{44}$ is generated by interpolation process using color information obtained from pixel signals of two blue pixels $B_{55}$ and $B_{33}$. Blue color information to be contained in one set of output pixel signals for a reproduction pixel corresponding to the position of the green pixel $G_{64}$ is generated by interpolation process using color information obtained from pixel signals of two blue pixels $B_{73}$ and $B_{55}$.

One set of output pixel signals corresponding to one reproduction pixel contains green color information obtained from a pixel signal of a green pixel G, and blue and red color information generated by the interpolation processes described above.

FIG. 4 is a conceptual diagram showing the relative distribution of reproduction pixels in an image reproduced on a monitor or by a printer in accordance with output pixel signals generated by the first signal processing unit. The row number and the column number shown in FIG. 4 do not correspond to those in the reproduced image but to those in the solid state image pickup device 10a.

As shown in FIG. 4, in an image reproduced from output pixel signals, reproduction pixels P are distributed in a square lattice pattern with corresponding to the positions of the green pixels G (refer to FIG. 3A) of the solid state image pickup device 10a.

Of the red, green and blue color information to be contained in each reproduction pixel, the first signal processing unit generates only the blue and red color information by the interpolation processes. Green color information is not necessary to be obtained through interpolation process. Green color information is obtained directly from green information (signals) obtained from the pixel signals of green pixels.

Although a number of color pixels are disposed in the pixel shift layout in the solid state image pickup device 10a, output pixel signals corresponding to the layout of reproduction pixels in the square matrix shape can be generated without performing a particular conversion process.

It is therefore possible to obtain predetermined output pixel signals by relatively simple signal processing.

Since the green color information is obtained without performing interpolation process, a time taken to obtain green color information to be contained in one set of output pixel signals is different from a time taken to obtain blue or red color information to be contained in the set of output pixel signals. If necessary, the green, blue and red color information to be contained in the set of output pixel signals is adjusted so as to be output from the video signal proceeding unit 65 at approximately the same timing.

This adjustment is possible, for example, by forming a delay circuit at a proper position in the transmission path of the pixel signals of the green pixels or in the transmission path of the green color information, or by disposing a storage unit such as a frame memory for storing the pixel signals of green, blue and red or color information of green, blue and red at a proper position in the first signal processing unit or outside the first signal processing unit.

The number of output pixels in the first image pickup mode is about a half of the number of effective pixels (color pixels) of the solid state image pickup device 10a.

If the first mode selector 82 shown in FIG. 1 selects the second image pickup mode, the video signal proceeding unit 65 can generate output pixel signals for reproduction pixels about twice as many as the total number of effective pixels (color pixels) of the solid state image pickup device 10a.

In the second image pickup mode, in accordance with the concept same as that illustrated in FIG. 3B or 3C, interpolation processes are executed for color information obtained from pixel signals of the green, blue and red pixels. In addition, output pixel signals for reproduction pixels corresponding to virtual color pixels are generated by the interpolation processes. Each of the virtual color pixels is arranged between two color pixels in each of the pixel columns and rows in the solid state image pickup device 10a.

FIG. 5 is a conceptual diagram showing the distribution of reproduction pixels in an image reproduced on a monitor or by a printer in accordance with output pixel signals generated by the second signal processing unit. Since the output pixel signals for reproduction pixels corresponding to virtual color pixels are generated by the interpolation processes, an image reproduced from the output pixel signals generated by the second signal processing unit has reproduction pixels P about twice as many as the total number of effective pixels (color pixels) of the solid state image pickup device 10a (refer to FIG. 2).

The solid state image pickup device 10 shown in FIG. 1 is not limited only to a device using primary color filters, but it may be a device using complementary color filters.

Figure 6:
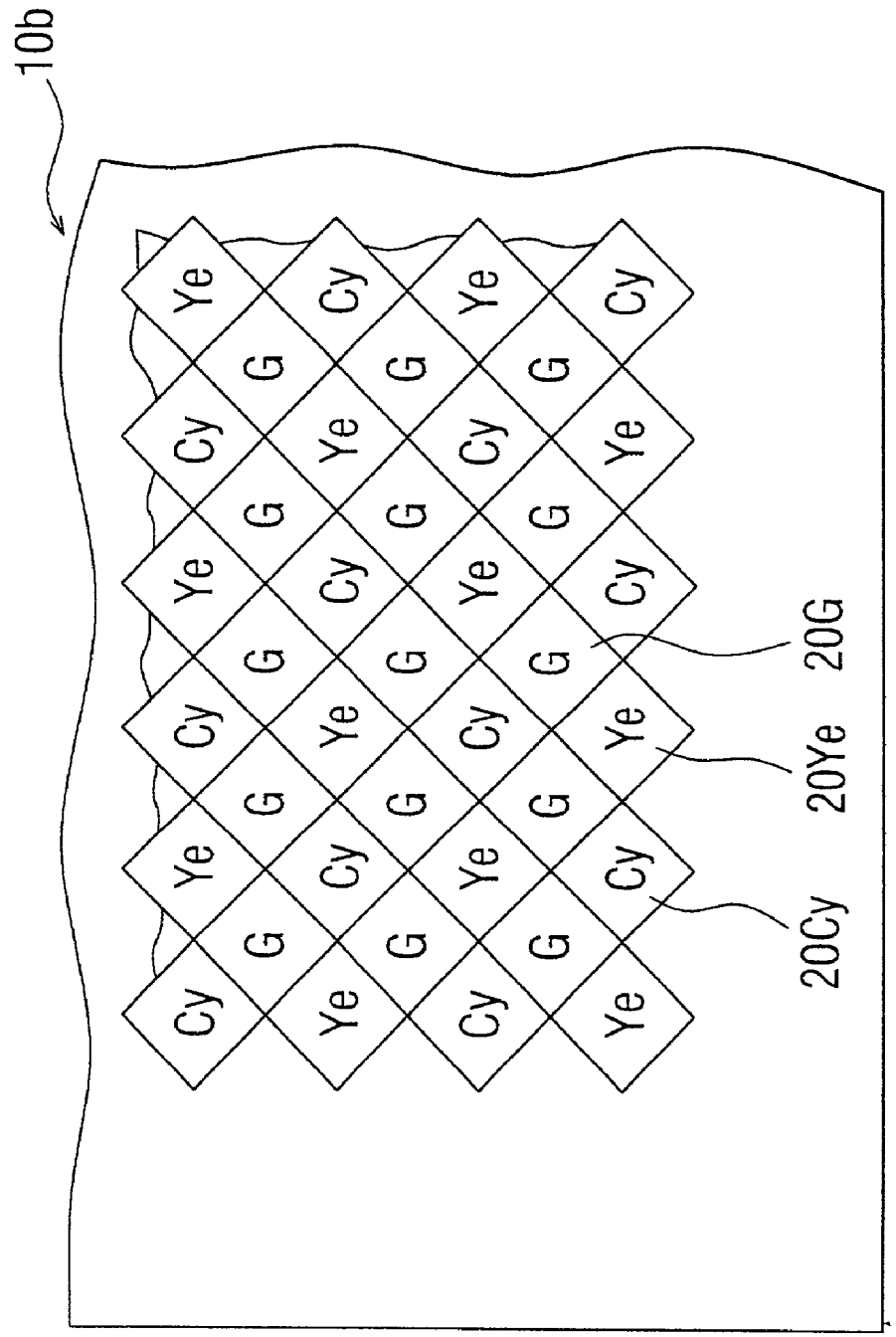
FIG. 6 is a schematic plan view of another solid state image pickup device usable as the solid state image pickup apparatus shown in FIG. 1.

FIG. 6 is a schematic diagram showing another example of a solid state image pickup device usable as the solid state image pickup device 10. A solid state image pickup device 10b shown in FIG. 6 uses complementary color filters and has three color-types of color pixels including cyan pixels 20Cy, yellow pixels 20Ye and green pixels 20G disposed in the pixel shift layout and special patterns.

More specifically, the green pixel 20G is disposed at every second rows and columns along the pixel column direction and pixel row direction, respectively, and the green pixels are disposed as a whole in a square lattice pattern. On both sides along the column direction of each green pixel row, a pixel row (hereinafter called a "cyan/yellow pixel row") is disposed which has a cyan pixel 20Cy and a yellow pixel 20Ye disposed at every second columns. Two juxtaposed cyan/yellow pixel rows sandwiching the green pixel row have the reversed orders of the cyan pixels 20Cy and yellow pixels 20Ye from each other.

In the solid state image pickup device 10b, a pixel signal from a green pixel 20G of the green pixel row and a pixel signal from a cyan pixel 20Cy or a yellow pixel 20Ye of the cyan/yellow pixel row downstream of the green pixel row are alternately output one pixel signal after another. For example, from the most downstream pixel row and the second most downstream pixel row, a pixel signal from the yellow pixel 20Ye, a pixel signal from the green pixel 20G, a pixel signal from the cyan pixel 20Cy, and a pixel signal from the green pixel 20G are sequentially output in this order.

In use of the solid state image pickup device 10b, prior to executing the interpolation processes already described with reference to FIGS. 3A to 3C and FIGS. 4 and 5, complementary color information is converted into primary color information. Without changing the structures of the first and second signal processing units, it is possible to generate output pixel signals similar to those of the solid state image pickup apparatus using the solid state image pickup device 10a shown in FIG. 2.

Figure 7:
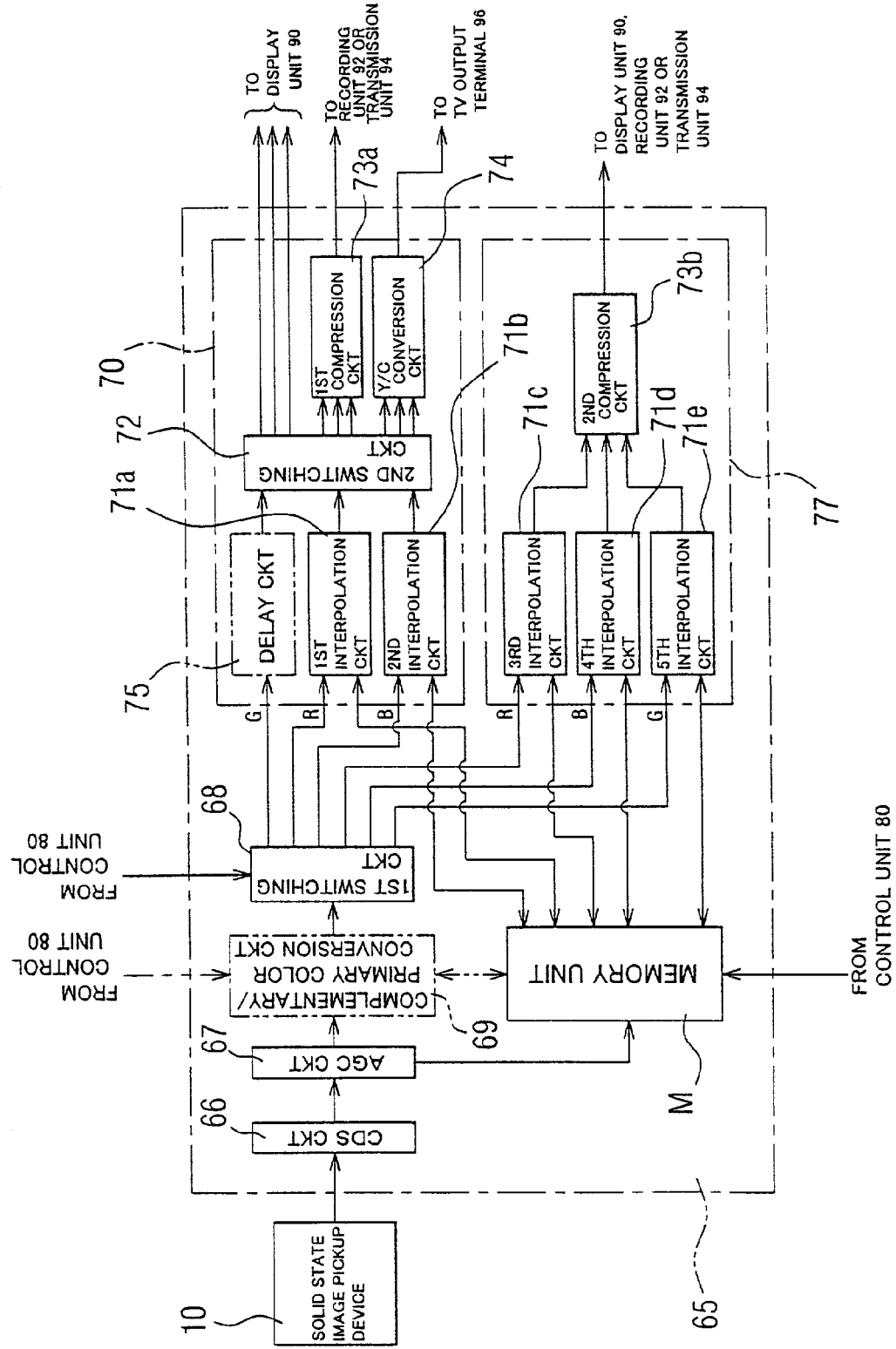
FIG. 7 is a block diagram conceptually showing an example of the structure of the video signal proceeding unit shown in FIG. 1.

The video signal proceeding unit 65 having the first and second signal processing units may have the configuration such as shown in FIG. 7. FIG. 7 is a conceptual block diagram showing an example of the configuration of the video signal proceeding unit 65. The video signal proceeding unit 65 shown in FIG. 7 has a correlation double sampling (CDS) circuit 66, an automatic gain control (AGC) circuit 67, a first switching circuit 68, a first signal processing unit 70, a second signal processing unit 77, and a memory unit M such as a dynamic random access memory (DRAM).

Pixel signals sequentially output from the solid state image pickup device 10 are input to the CDS circuit 66 which eliminates noises of the pixel signals and then supplied via the AGC circuit 67 to the first switching circuit 68.

If the solid state image pickup device 10 uses primary color filters, each of red, green and blue color information obtained from pixel signals is sequentially supplied to the first switching circuit 68. All or a part of the color information is also supplied to the memory unit M to be stored and managed therein.

If the solid state image pickup device 10 uses complementary color filters, a complementary/primary color conversion circuit 69 is provided, for example, between the AGC circuit 67 and first switching circuit 68. The complementary/primary color conversion circuit 69 temporarily stores complementary color information obtained from pixel signals of at least three color pixel rows in the memory unit M. Necessary complementary color information is read from the memory unit M to perform color separation and generate red, green and blue color information. The operation of the complementary/primary color conversion circuit 69 is controlled, for example, by the control unit 80 shown in FIG. 1.

The red, green and blue color information generated by the complementary/primary color conversion circuit 69 is sequentially supplied to the first switching circuit 68. All or a part of the color information is supplied to the memory unit M to be stored and managed therein.

While the first mode selector 82 shown in FIG. 1 selects the first image pickup mode, the red, green and blue color information sequentially supplied to the first switching circuit 68 is supplied to the first signal processing circuit 70. The operation of the first switching circuit 68 is controlled, for example, by the control unit 80 shown in FIG. 1.

In the first signal processing unit 70, the red color information R is supplied to a first interpolation circuit 71*a*, the blue color information B is supplied to a second interpolation circuit 71*b*, and the green color information G is supplied via a delay circuit 75 or directly to a second switching circuit 72. The delay circuit 75 adjusts the arrival timing of the green color information G to the second switching circuit 72 so that the red, green and blue color information to be contained in one set of output pixel signals is supplied to the second switching circuit 72 at substantially the same timing.

Figure 8:
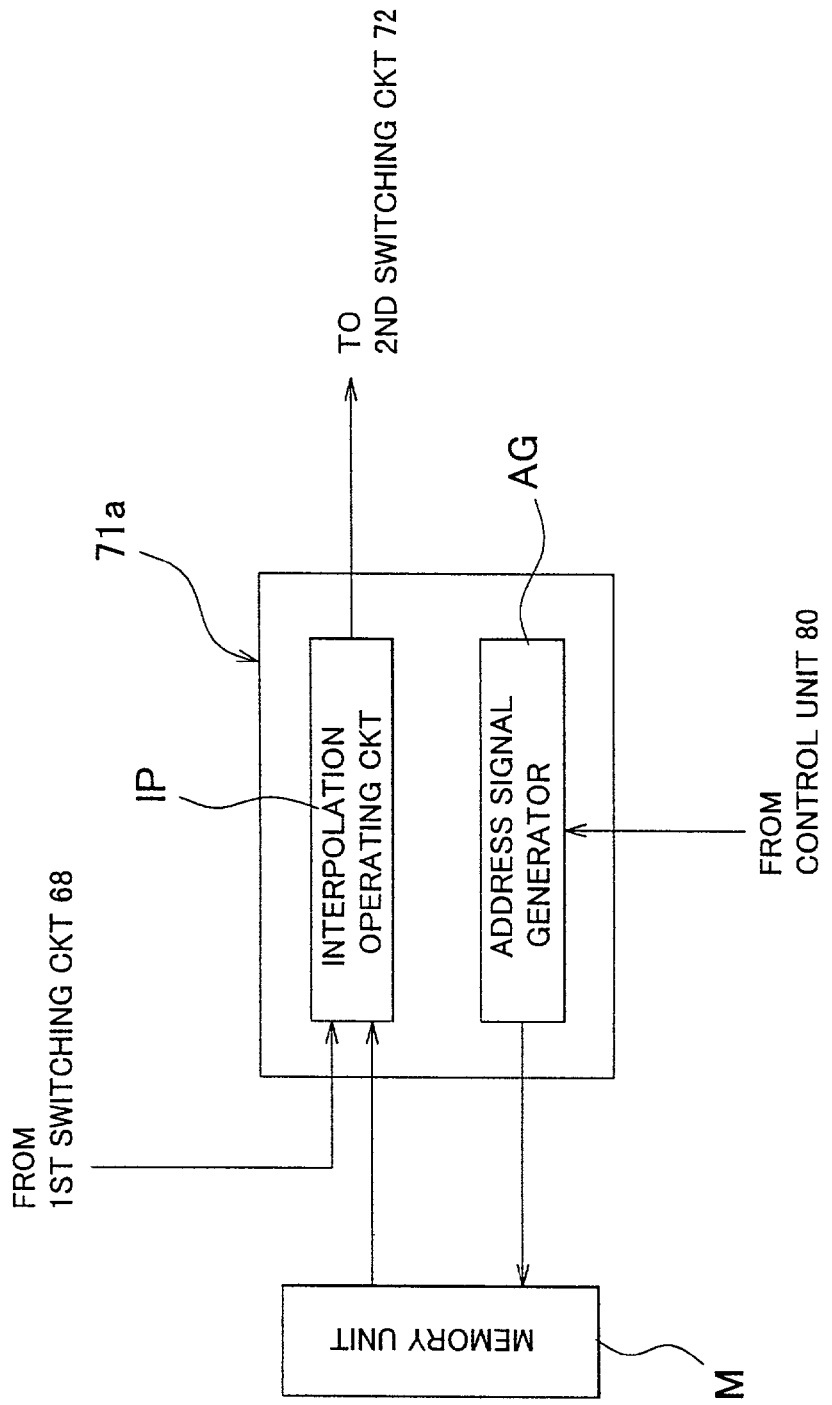
FIG. 8 is a block diagram conceptually showing a first interpolation circuit shown in FIG. 7.

As shown in FIG. 8, the first interpolation circuit 71*a* has an address signal generator AG and an interpolation operating circuit IP. The address signal generator AG is controlled by the control unit 80 and generates a predetermined address signal. In accordance with this address signal, red color information necessary for the interpolation process is read from the memory unit M, and supplied to the interpolation operating circuit IP.

By using red color information newly input from the first switching circuit 68 and red color information already stored in the memory unit M, the interpolation operating circuit IP performs an interpolation process such as described with FIG. 3B to generate red color information to be contained in a set of output pixel signals.

The second interpolation circuit 71*b* is configured in the manner similar to the first interpolation circuit 71*a* shown in FIG. 8. In accordance with a predetermined address signal generated by the address generator, the second interpolation circuit 71*b* reads blue color information necessary for the interpolation process from the memory unit M. The blue color information is supplied to the interpolation operating circuit.

By using blue color information newly input from the first switching circuit 68 and blue color information already stored in the memory unit M, the interpolation operating circuit performs an interpolation process such as described with FIG. 3C to generate blue color information to be contained in the output pixel signals.

In this manner, each of the first and second interpolation circuits 71*a* and 71*b* may be configured to read only one of two pieces of the color information necessary for the interpolation process, i.e., only the color information obtained from a pixel signal generated faster in the time axis, from the memory unit M and is supplied with the other color information from the first switching circuit 68.

Each of the first and second interpolation circuits 71*a* and 71*b* may be configured so that two pieces of color information necessary for the interpolation process are read from the memory unit M. In this case, the first switching circuit 68 is not necessary to be wired to the first and second interpolation circuits 71*a* and 71*b*.

The red color information generated by the first interpolation circuit 71*a* and blue color information generated by the second interpolation circuit 71*b* are supplied to the second switching circuit 72 (refer to FIG. 7).

The second switching circuit 72 supplies the color information to an output destination selected by the second mode selector 84 shown in FIG. 1.

If the output destination of the color information is the display unit 90 (refer to FIG. 1), the color information is supplied, for example, directly to the display unit 90. If the output destination is the recording unit 92 or transmission unit 94, the color information is supplied, for example, to a first compression circuit 73*a* whereat the information is compressed and then supplied to the recording unit 92 or transmission unit 94. If the output destination is the TV output terminal 96, the color information is supplied to a Y/C conversion circuit 74 whereat the color information is converted into luminance signals Y and color difference signals C which are then supplied to the TV output terminal 96.

While the first mode selector 82 shown in FIG. 1 selects the second image pickup mode, red, green and blue color information sequentially supplied to the first switching circuit 68 is supplied to the second signal processing unit 77.

In the second signal processing unit 77, the red color information R is supplied to a third interpolation circuit 71*c*, the blue color information B is supplied to a fourth interpolation circuit 71*d*, and the green color information G is supplied to a fifth interpolation circuit 71*e*.

Each of the third to fifth interpolation circuits 71*c* to 71*e* can be configured in the similar manner to the first interpolation circuit 71*a*, and the operation thereof is similar to that of the first interpolation circuits 71*a*. The operation of each of the third to fifth interpolation circuits 71*c* to 71*e* will be described briefly.

The third interpolation circuit 71*c* performs an interpolation process by using two to four pieces of red color information obtained from two to four pixel signals of red color pixels per one reproduction pixel to generate red color information to be contained in the output pixel signals. Reproduction pixels are disposed in the square matrix shape such as shown in FIG. 5.

Similarly, the fourth interpolation circuit 71*d* generates blue color information to be contained in the output pixel signals by the interpolation process, and the fifth interpolation circuit 71*e* generates green color information to be contained in the output pixel signals by the interpolation process.

The color information generated by the third to fifth interpolation circuits 71*c* to 71*e* is supplied to a second compression circuit 73*b* whereat the information is compressed and supplied to one of the display unit 90, recording unit 92 and transmission unit 94 in accordance with the output destination selected by the second mode selector 84. The solid state image pickup apparatus 100 may be structured in such a manner that the output from the second compression circuit 73*b* can be supplied to the TV output terminal 96.

The solid state image pickup device 10 for generating pixel signals which are supplied to the image signal proceeding unit 65 is, for example, a CCD type or MOS type solid state image pickup device.

Figure 9:
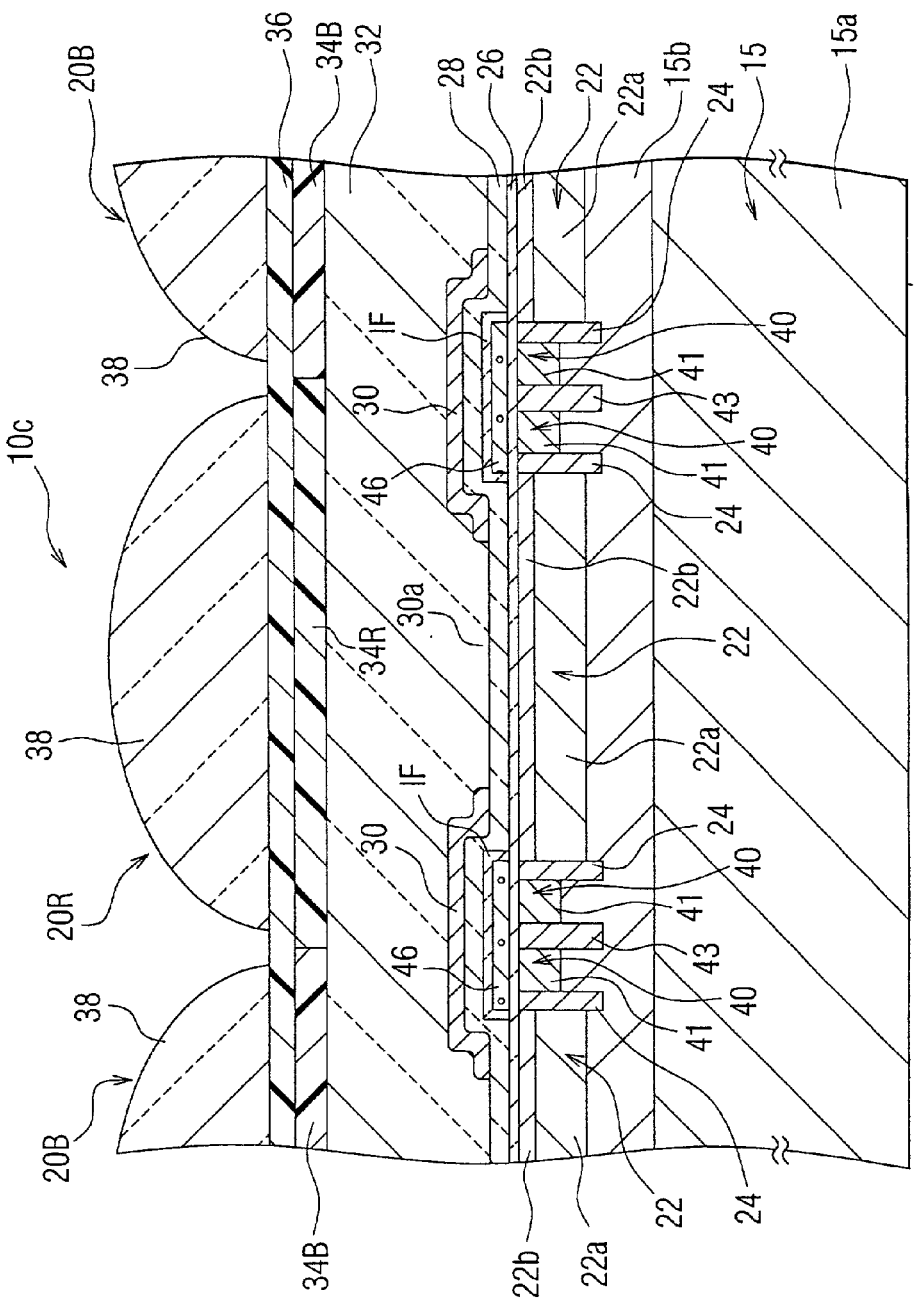
FIG. 9 is a schematic diagram showing the cross sectional structure, as viewed along a predetermined direction, of color pixels of a CCD type solid state image pickup device usable as the solid state image pickup device shown in FIG. 2.
Figure 10:
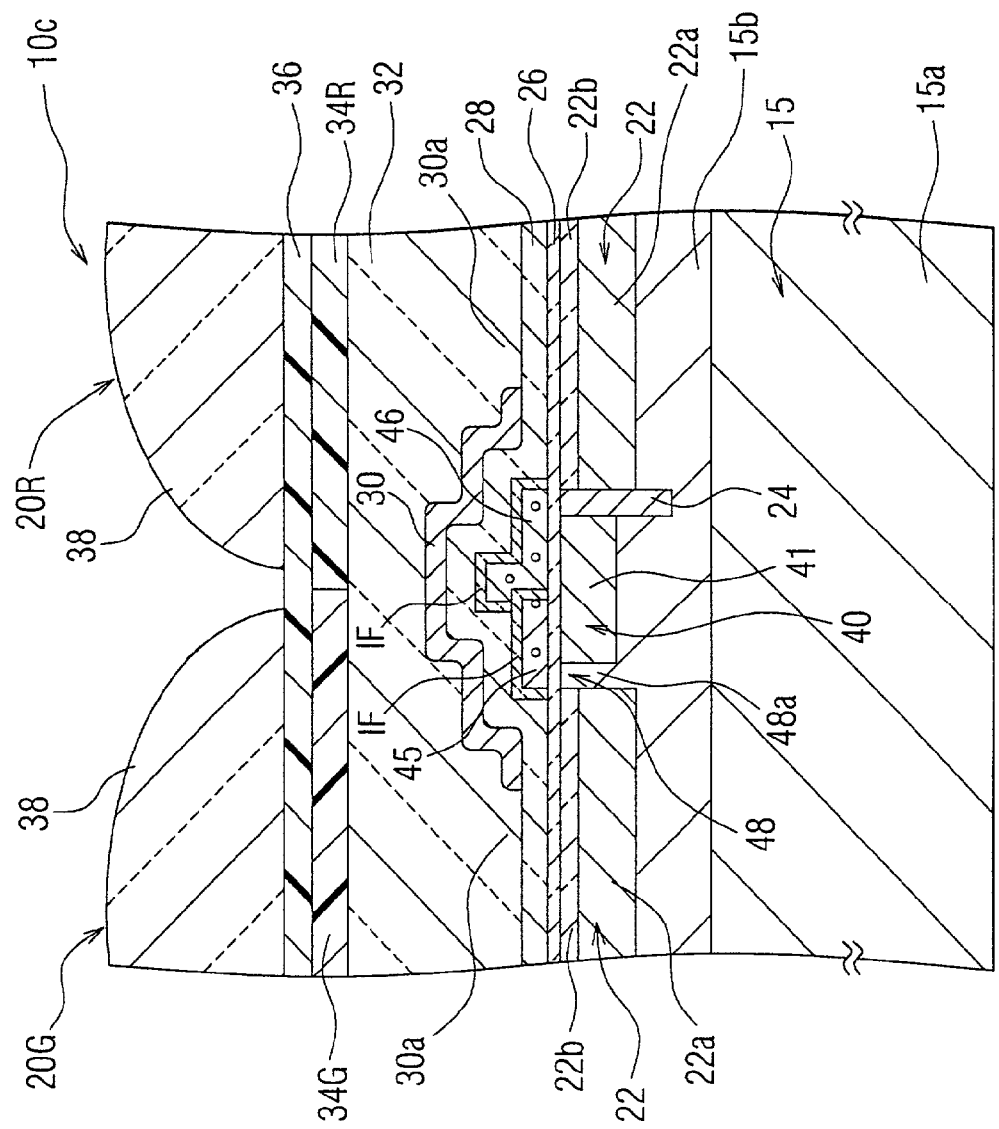
FIG. 10 is a schematic diagram showing the cross sectional structure, as viewed along another direction, of color pixels of the CCD type solid state image pickup device usable as the solid state image pickup device shown in FIG. 2.

FIGS. 9 and 10 are schematic diagrams showing the structure of a color pixel of a CCD type solid state image pickup device 10*c* usable as the solid state image pickup device 10*a* shown in FIG. 2. FIG. 9 is a schematic cross sectional view taken along line IX—IX shown in FIG. 2, and FIG. 10 is a schematic cross sectional view taken along line X—X shown in FIG. 2. In FIGS. 9 and 10, the scales in the direction perpendicular to the thickness direction of the solid state image pickup device 10c are made different for convenience.

As shown in FIGS. 9 and 10, each of the color pixels 20R, 20G and 20B has a photoelectric conversion element (photodiode) 22 formed in one surface of a semiconductor substrate 15 and a corresponding one of color filters 34R, 34G and 34B disposed above the photoelectric conversion element 22 (before the element 22 in the light incidence course). By disposing a micro lens 38 for each 25 photoelectric conversion element 22 thereabove, the light use efficiency of the photoelectric conversion element 22 can be improved.

In the example shown in FIGS. 9 and 10, the semiconductor substrate 15 is constituted of an n-type semiconductor substrate 15a and a p-type impurity doped region 15b formed in the surface of the substrate 15a.

Each photoelectric conversion element 22 has an n-type impurity doped region 22a and a p$^+$-type impurity doped region 22b disposed on the region 22a. A p-type impurity concentration in the p$^+$-type impurity doped region 22b is higher than that of the p-type impurity doped region 15b.

A channel stopper region 24 is formed surrounding the outer periphery of each photoelectric conversion element 22 as viewed in plan, excepting the regions where read gate regions 48a are formed as shown in FIG. 10. For example, the channel stopper region 24 is made of a p+-type impurity doped region.

As will be later described, one read gate region 48a is disposed for each photoelectric conversion element 22. The read gate region 48a is formed in the lower right area of associated photoelectric conversion element 22 as viewed in plan and adjoined to the element 22.

An electrically insulating layer 26 made of silicon oxide or the like is formed on the surface (surfaces of the impurity doped regions) of the semiconductor substrate 15, and a passivation (protection) layer 28 is formed on the insulating layer 26. For example, the passivation layer 28 is made of silicon nitride, silicon oxide, phosphosilicate glass (PSG), borophosphosilicate glass (BPSG), polyimide or the like. This passivation layer also covers each vertical charge transfer element 40 to be described later.

A light shielding layer 30 covers each vertical charge transfer element 40 and the inner peripheral area, as viewed in plan, of the photoelectric conversion element 22 near the vertical charge transfer element 40. The light shielding layer 30 has an opening 30a disposed for each photoelectric conversion element 22 thereabove. The surface of each photoelectric conversion element 22 in the opening 30a, as viewed in plan, is a light incidence plane.

The light shielding layer 30 is made of: a metal thin layer of aluminum, chromium, tungsten, titanium, molybdenum or the like; an alloy thin layer of two or more of these metals; a multi-layer of metal thin layers; a multi-layer of two or more selected from a group consisting of the metal thin layers and alloy thin layers.

A first planarizing layer 32 covers the light shielding layer 30 and the passivation layer 28 exposed in the openings 30a. The first planarizing layer 32 may be also used as a focus adjusting layer for the micro lenses 38. If necessary, inner lenses are formed in the first planarizing layer 32.

For example, the first planarizing layer 32 is formed by spin-coating transparent resin such as photoresist to a desired thickness.

Color filters 34R, 34G and 34B are formed on the first planarizing layer 32. For example, each of the color filters 34R, 34G and 34B is formed by forming resin (color resin) layer containing pigment or dye of desired color on the first planarizing layer 32 in predetermined areas by photolithography.

A second planarizing layer 36 covers the color filters 34R, 34G and 34B. For example, the second planarizing layer 46 is formed by spin-coating transparent resin such as photoresist to a desired thickness.

Each micro lens 38 is formed on the second planarizing layer 36. For example, these micro lenses 38 are formed by patterning a layer of transparent resin (including photoresist) having a refractive index of about 1.3 to 2.0 into sections having a predetermined shape by photolithography, melting each section of the transparent resin by heat treatment, rounding the sides by the surface tension, and then cooling them. One section corresponds to one micro lens.

As light becomes incident upon each of the color pixels 20R, 20G and 20B, electric charge corresponding to the quantity of the incident light is accumulated in the n-type impurity doped region 22a. Each column of color pixels disposed in the pixel shift layout is provided with the vertical charge transfer element 40 made of CCD in order to read the charges from corresponding ones of the color pixels 20R, 20G and 20B and transfer them to a horizontal charge transfer element.

The vertical charge transfer element 40 has a charge transfer channel 41 formed in the p$^+$-type impurity doped region 15b and a number of vertical transfer electrodes 45 and 46 traversing over the charge transfer channel 41 as viewed in plan.

The charge transfer channel 41 is made of, for example, an n-type impurity doped region, and extends along the color pixel column in a zigzag way. Channel stopper regions 43 (refer to FIG. 9) are formed in regions wherein two charge transfer channels 41 juxtapose with no photoelectric conversion element 22 intervening therebetween. For example, the channel stopper region 43 is made of a p$^+$-type impurity doped region formed in the p-type impurity doped region 15b.

Each vertical transfer electrode 45 (refer to FIG. 10) is made of, for example, a first polysilicon layer formed on the electrically insulating layer 26. The vertical transfer electrode 45 is provided for each color pixel row and extends in a zigzag way along the corresponding color pixel row on the downstream side thereof. Each of the vertical transfer electrodes 45 extends to the color pixel row direction as a whole.

The vertical transfer electrode 45 covers, as viewed in plan, the read gate regions 48a adjoining to the photoelectric conversion elements 22 constituting the corresponding color pixel row. One read gate 48 (refer to FIG. 10) is constituted of one read gate region 48a and a partial region of the vertical transfer electrode 45 covering, as viewed in plan, the read gate region 48a.

Each vertical transfer electrode 46 is made of, for example, a second polysilicon layer formed on the electrically insulating layer 26. The vertical transfer electrode 46 is provided for each color pixel row and extends in a zigzag way along the corresponding color pixel row on the upstream side thereof. Each of the vertical transfer electrodes 46 extends to the color pixel row direction as a whole.

The vertical transfer electrode 46 and the nearby vertical transfer electrode 45 have an overlap structure. The side area of the vertical transfer electrode 46 overlaps the side area of the vertical transfer electrode 45.

An electrically insulating layer IF made of, for example, a silicon oxide layer is disposed for each vertical transfer electrode 45 thereon and for each vertical transfer electrode 46 thereon. The electrically insulating layer IF electrically isolate the vertical transfer electrode 45 and the nearby vertical transfer electrode 46 from each other.

Figure 11:
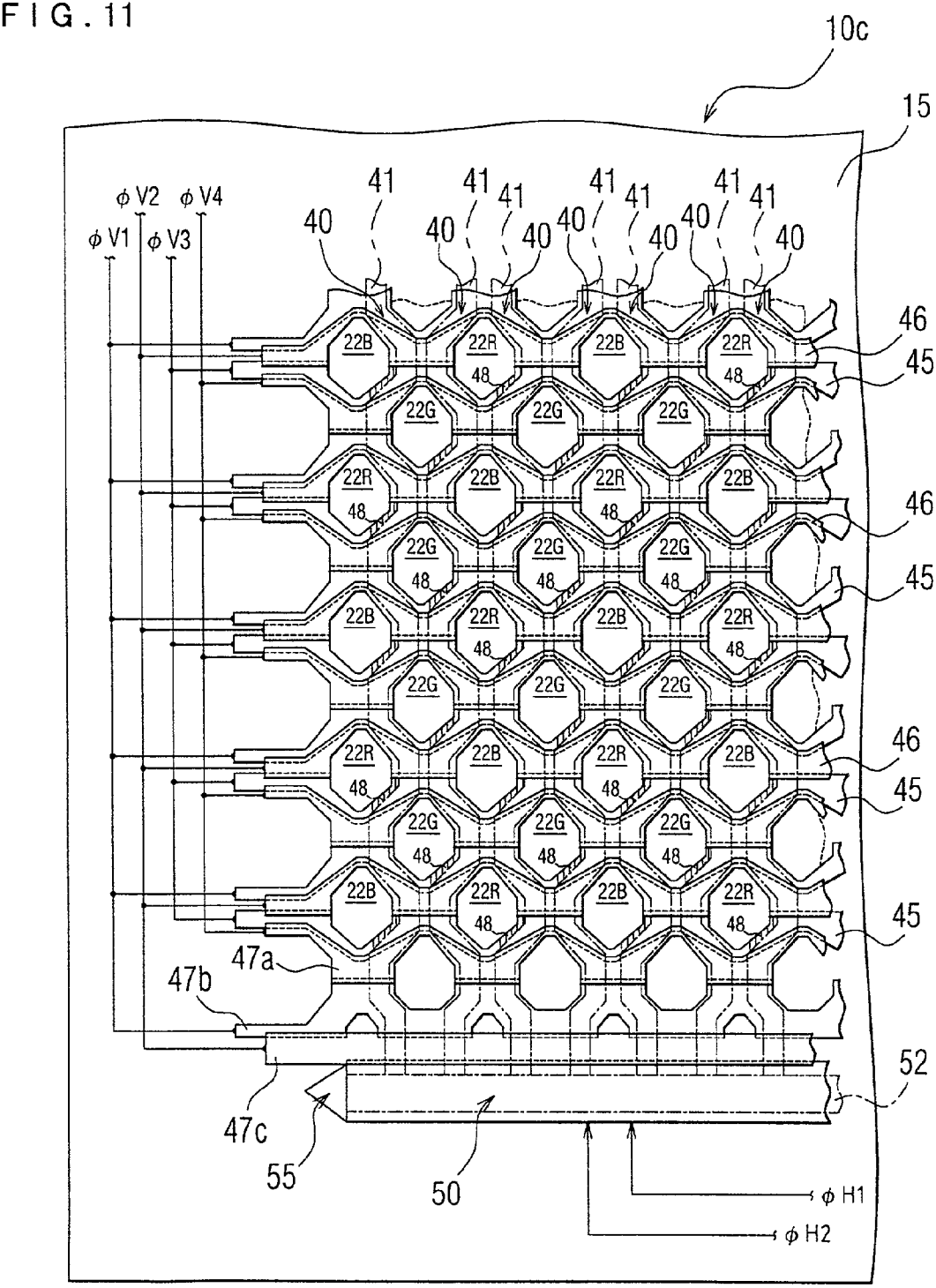
FIG. 11 is a schematic plan view showing the layout of photoelectric conversion elements, vertical charge transfer elements, read gates, a horizontal charge transfer element and an output amplifier in the solid state image pickup device shown in FIGS. 9 and 10.

FIG. 11 is a schematic diagram showing the plan layout of the photoelectric conversion elements 22, vertical charge transfer elements 40 and read gates 48, respectively of the solid state image pickup device 10c shown in FIGS. 9 and 10. FIG. 11 also shows the layout of a horizontal charge transfer element and an output amplifier omitted in FIGS. 9 and 10.

In FIG. 11, each of the photoelectric conversion elements 22 is given a character R, G or B in order to identify the color-type of the color pixel of which the photoelectric conversion element 22 is a constituent member. The photoelectric conversion element 22R is a constituent member of the red color pixel 20R (refer to FIG. 2), the photoelectric conversion element 22G is a constituent member of the green color pixel 20G (refer to FIG. 2), and the photoelectric conversion element 22B is a constituent member of the blue color pixel 20B (refer to FIG. 2).

In order to clearly show the position of the read gate 48 as viewed in plan, the read gate 48 is shown hatched.

FIG. 11 also shows an example of wiring for driving the vertical charge transfer elements 40 by four-phase drive signals φV1 to φV4 and driving the horizontal charge transfer element 50 by two-phase drive signals φH1 and φH2.

As seen from FIG. 11, in the solid state image pickup device 10c, the vertical transfer electrodes 45 and 46 are provided for each photoelectric conversion element row (each color pixel row). Three auxiliary transfer electrodes 47a, 47b and 47c are provided downstream of the most downstream vertical transfer electrode 45.

The vertical transfer electrodes 45, 46, and three auxiliary transfer electrodes 47a to 47c are classified into four groups to which different vertical drive signals φV1 to φV4 are applied. One group is constituted of the transfer electrodes 45, 46, 47a, 47b or 47c selected at every third positions. Each vertical charge transfer element 40 is made of a four-phase drive type CCD.

Each vertical charge transfer element 40 has four transfer electrodes per each photoelectric conversion element 22 (each color pixel) so that pixel signals of all pixels of the solid state image pickup device 10c can be read at a time. The read pulses are superposed upon the vertical drive signals φV1 and φV3.

Charges read from the photoelectric conversion elements 22R, 22G and 22B to the associated vertical charge transfer element 40 are transferred by this element 40 to the horizontal charge transfer element 50. In this case, charges read from a photoelectric conversion element row (color pixel row) of the odd row as counted from the downstream side and charges read from another row upstream of the first-mentioned row by just one row are transferred to the horizontal charge transfer element 50 at the same timing.

The horizontal charge transfer element 50 is made of a two-phase drive type CCD driven by the horizontal drive signals φH1 and φH2. This horizontal charge transfer element 50 has a horizontal charge transfer channel 52 and a number of horizontal transfer electrodes (not shown) traversing the channel 52 as viewed in plan.

The horizontal charge transfer channel 52 is made, for example, of an n-type impurity doped region formed in the p-type impurity doped region 15b (refer to FIG. 9 or 10) of the semiconductor substrate 15, and extends to the photoelectric conversion element row (color pixel row) direction.

Each horizontal transfer electrode is made of, for example, the first or second polysilicon layer formed on the electrically insulating layer 26 (refer to FIG. 9 or 10). For example, four horizontal transfer electrodes are provided for each vertical charge transfer element 40, and the horizontal transfer electrode made of the first polysilicon layer and the horizontal transfer electrode made of the second polysilicon layer are alternately and repetitively disposed. An electrically insulating layer made of, for example, a silicon oxide layer (thermally oxidized layer), is disposed for each horizontal transfer electrode thereon.

The horizontal charge transfer element 50 sequentially transfers the charges supplied from the vertical charge transfer elements 40 to an output amplifier 55.

The output amplifier 55 sequentially receives the charges from the horizontal charge transfer element 50, converts the received charges into signal voltages, for example, by using a floating capacitor (not shown), and amplifies these signal voltages by using a source follower circuit (not shown) or the like to generate pixel signals. The charge in the floating capacitor after the detection (conversion) is absorbed in a power source (not shown) via a reset transistor (not shown).

The pixel signals generated by the output amplifier 55 are supplied to the video signal proceeding unit 65 shown in FIG. 1 or 7.

Figure 12:
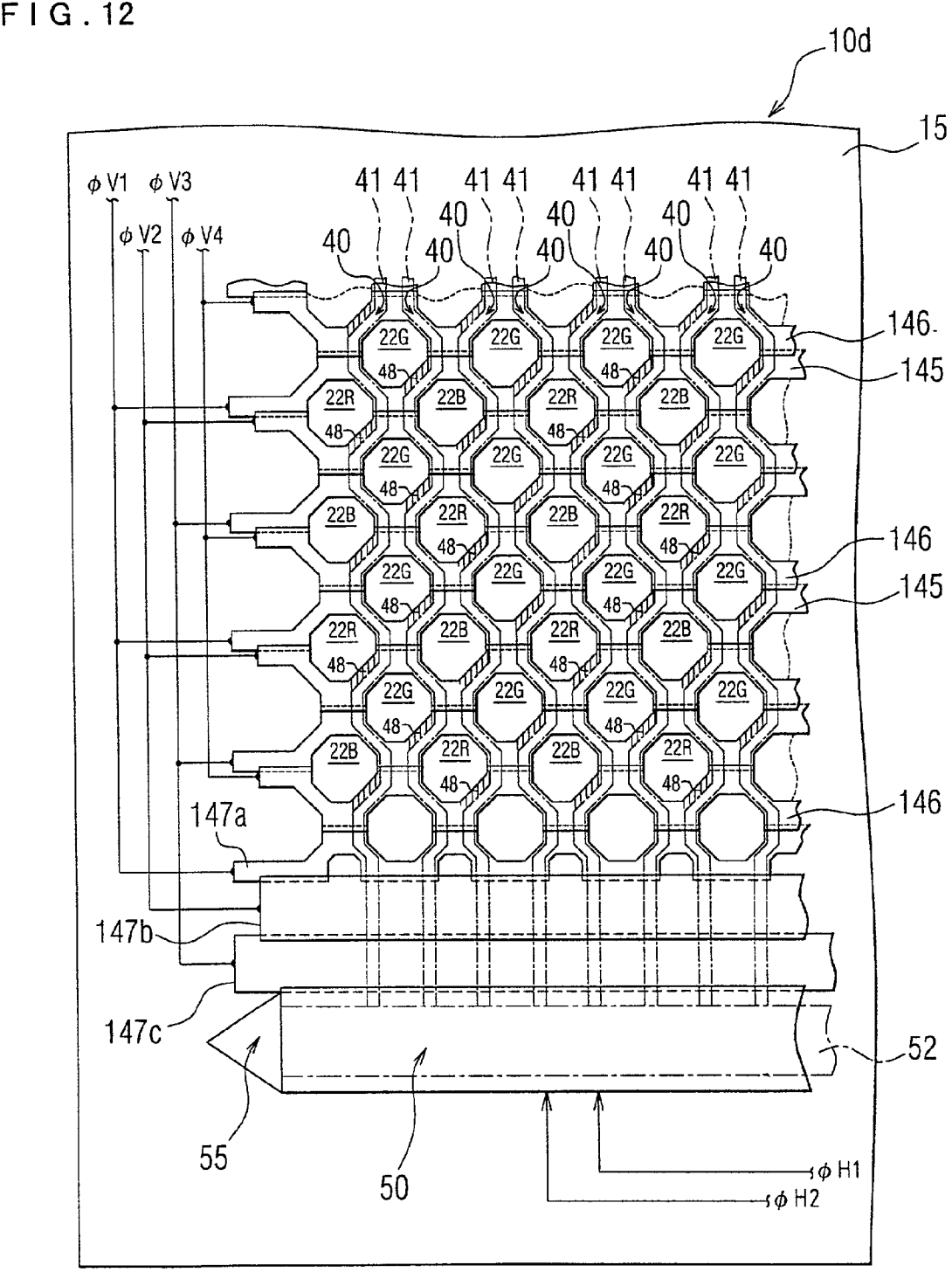
FIG. 12 is a schematic plan view showing the layout of photoelectric conversion elements, vertical charge transfer elements, read gates, a horizontal charge transfer element and an output amplifier in another CCD type solid state image pickup device usable as the solid state image pickup device shown in FIG. 2.

FIG. 12 is a schematic diagram showing the plan layout of the photoelectric conversion elements 22, vertical charge transfer elements 40, read gates 48, horizontal charge transfer element 50 and output amplifier 55, respectively of another solid state image pickup device 10d usable as the solid state image pickup device 10a shown in FIG. 2.

The solid state image pickup device 10d shown in FIG. 12 includes (n+1) vertical transfer electrodes 145 and 146 for n (n is an integer of 1 or larger) photoelectric conversion element rows (n color pixel rows). The vertical transfer electrodes 146 and 145 are alternately and repetitively disposed in this order from the downstream side. Three auxiliary transfer electrodes 147a, 147b and 147c are provided downstream of the most downstream vertical transfer electrode 146. Therefore, each vertical charge transfer element 40 has two transfer electrodes per one photoelectric conversion element 22 (one color pixel). Excepting these points, the solid state image pickup device 10d has same structure as that of the solid state image pickup device 10c shown in FIG. 11.

Constituent elements shown in FIG. 12 having the functions similar to those of the constituent elements shown in FIG. 11 are represented by the identical reference symbols to those shown in FIG. 11, excepting the vertical transfer electrodes and auxiliary transfer electrodes, and the description thereof is omitted.

The solid state image pickup device 10d having the above-described structure is driven, for example, under the half thinning drive mode. In the half thinning drive mode, one frame is divided into two fields in the unit of a photoelectric conversion element row (color pixel row). Charges are read from the photoelectric conversion elements (color pixels) of each field to the associated vertical charge transfer element 40. For example, one field is constituted of photoelectric conversion element rows (color pixel rows) selected at every third positions, and the photoelectric conversion element rows (color pixel rows) upstream of the first-mentioned rows by just one row.

In using the solid state image pickup device 10d as the solid state image pickup device 10 shown in FIG. 1, it is preferable that the memory unit M of the video signal proceeding circuit 65 has a capacity capable of storing color information corresponding to the pixel signals of one frame. In this case, the interpolation processes are performed by using the color information stored in the memory unit M.

The solid state image pickup device of the embodiments has been described above. The present invention is not limited only to the above embodiments. It is apparent that various modifications, improvements, combinations, and the like can be made by those skilled in the art.

Especially, the operation excepting the interpolation processes for generating output pixel signals at a relatively low resolution could be modified in various ways.

The image signal proceeding unit may be realized by using various circuits such as a clamp circuit, a gamma correction circuit, a white clip circuit, a contour correction circuit, a vertical false signal suppressing circuit, a tracking correction circuit, a high luminance coloring preventing circuit and a low chroma compression circuit in addition to the constituent elements shown in FIG. 7.

As described so far, according to the present invention, output pixel signals can be obtained by relatively simple signal processing. A solid state image pickup apparatus can be provided with a lower cost.

What we claim are:

1. A solid state image pickup apparatus comprising:
   a solid state image pickup device having a number of color pixels disposed in a plurality of rows and columns in a pixel shift layout and generating and outputting pixel signals, said number of color pixels including at least three kinds of color pixels, color pixels of one of said at least three kind being distributed in a square lattice pattern aligned in row and column directions;
   a first signal processing unit for generating output pixel signals at at least some of said color pixels by using signals based on said pixel signals, said first signal processing unit generating a part of each output pixel signal directly from signals based on pixel signals of the color pixels of said one kind and generating another part of each output pixel signal through an interpolation process using signals based on pixel signals of color pixels of another of said at least three kinds, wherein, for each output pixel signal, the color pixels used in the interpolation process are located in rows above and below a row containing the color pixels of said one kind used in generating said output pixel signal, respectively; and
   a second signal processing unit for generating output pixel signals at interstitial positions of said color pixels by performing interpolation processes using signals based on pixel signals of said number of color pixels, the interstitial positions and the color pixel positions constituting a tetragonal lattice.

2. A solid state image pickup apparatus according to claim 1, wherein said at least three kinds of color pixels are red color pixels, green color pixels and blue color pixels.

3. A solid state image pickup apparatus according to claim 2, wherein color pixels of said one kind are green color pixels.

4. A solid state image pickup apparatus according to claim 1, wherein said at least three kinds of color pixels include complementary color pixels.

5. A solid state image pickup apparatus according to claim 3, wherein color pixels of said one kind are green color pixels.

6. A solid state image pickup apparatus according to claim 1, wherein said at least three kinds of color pixels are color pixels of three kinds, said first signal processing unit generates the other part of output pixel signals through interpolation process using signals based on pixel signals of color pixels of the other kind of said three kind.

7. A solid state image pickup apparatus according to claim 1, wherein said solid state image pickup device further comprises a vertical charge transfer element provided for each color pixel column, each said vertical charge transfer element being electrically connected to each color pixel of a corresponding color pixel column.

8. A solid state image pickup apparatus according to claim 7, wherein said solid state image pickup device further comprises a horizontal charge transfer element electrically connected to each said vertical charge transfer element and an output amplifier electrically connected to the horizontal charge transfer element.

9. A solid state image pickup apparatus according to claim 1, wherein said output pixel signals generated by the first signal processing unit are generated at positions of said one kind of color pixels.

10. A solid state image pickup apparatus according to claim 1, wherein the number of output pixel signals generated by the first signal processing unit is half the number of color pixels.

* * * * *